US009765263B2

(12) United States Patent
Vassieu et al.

(10) Patent No.: US 9,765,263 B2
(45) Date of Patent: Sep. 19, 2017

(54) METHOD AND INSTALLATION FOR DEHYDRATION BY MEANS OF A DELIQUESCENT PRODUCT

(71) Applicant: QUADRIMEX CHEMICAL SAS, Cavaillon (FR)

(72) Inventors: Maxime Vassieu, Montfavet (FR); Jean-Claude Chinh, St Mitre les Remparts (FR)

(73) Assignee: QUADRIMEX CHEMICAL SAS, Cavaillon (FR)

( * ) Notice: Subject to any disclaimer, the term of this patent is extended or adjusted under 35 U.S.C. 154(b) by 194 days.

(21) Appl. No.: 14/414,502

(22) PCT Filed: Jul. 4, 2013

(86) PCT No.: PCT/EP2013/064119
§ 371 (c)(1),
(2) Date: Apr. 21, 2015

(87) PCT Pub. No.: WO2014/009239
PCT Pub. Date: Jan. 16, 2014

(65) Prior Publication Data
US 2015/0252271 A1    Sep. 10, 2015

(30) Foreign Application Priority Data

Jul. 13, 2012 (EP) .................... 12358004

(51) Int. Cl.
*B01D 53/28* (2006.01)
*C10G 33/04* (2006.01)
(Continued)

(52) U.S. Cl.
CPC ....... *C10G 25/003* (2013.01); *B01D 17/0202* (2013.01); *B01D 53/261* (2013.01);
(Continued)

(58) Field of Classification Search
None
See application file for complete search history.

(56) References Cited

U.S. PATENT DOCUMENTS 3,246,453 A    4/1966 Becker
3,403,198 A *  9/1968 Van Pool .................. C07C 2/62
                                                      208/262.1

FOREIGN PATENT DOCUMENTS

EP    0 171 578 A2    2/1986
EP    0 171 578 A3    2/1986
WO    WO 2012/010754 A1    1/2012

OTHER PUBLICATIONS

Augier, F., et al; "Liquid Drying by Solid Desiccant Materials: Experimental Study and Design Method"; *Oil & Gas Science and Technology—Rev. IFP*; vol. 63, No. 6, pp. 713-722 (2008).

(Continued)

*Primary Examiner* — Tam M Nguyen
(74) *Attorney, Agent, or Firm* — Nixon & Vanderhye P.C.

(57) ABSTRACT

Dehydration method for a liquid or gaseous effluent selected from LPG, gasoline, diesel, kerosene, solvents and natural gases, by inserting the liquid or gaseous effluent against gravity through a drying column having a drying bed with an initial height (H+h) constituted in its lower area by an inert material bed having the height of h and in its upper area by deliquescent desiccants having an initial height of H. The deliquescent desiccants have an initial weight of between 3 and 40 g, the h/H ratio is lower than 0.49, and the inert material has a specific surface area greater than 100 m2/m3 and lower than 800 m2/m3. The method further includes separating water obtained from the liquid or gaseous effluent.

14 Claims, 7 Drawing Sheets

(51) Int. Cl.
   *C10L 1/08*   (2006.01)
   *C10G 25/00*  (2006.01)
   *B01D 17/02*  (2006.01)
   *B01D 53/26*  (2006.01)

(52) U.S. Cl.
   CPC ............ *B01D 53/28* (2013.01); *C10G 33/04* (2013.01); *C10L 1/08* (2013.01); *B01D 2251/304* (2013.01); *B01D 2251/306* (2013.01); *B01D 2253/304* (2013.01); *C10L 2200/0446* (2013.01); *C10L 2270/026* (2013.01); *C10L 2290/08* (2013.01); *C10L 2290/542* (2013.01)

(56) References Cited

OTHER PUBLICATIONS

Barnett, J.W.; "New Salt Product Dries Distillate Streams, Eliminates Haze"; *Oil and Gas Journal*, vol. 94, No. 16, pp. 68-70 (XP000595914).

\* cited by examiner

METHOD AND INSTALLATION FOR DEHYDRATION BY MEANS OF A DELIQUESCENT PRODUCT

The invention relates to a method and a unit for the dehydration or drying of liquids and/or gases by means of deliquescent desiccants. In particular, this invention makes it possible to reduce consumption of deliquescent desiccants while improving the dehydration performance of said method and its unit.

BACKGROUND OF THE INVENTION

For decades, drying technology using deliquescent desiccants has been used in the industry. Recently, the producers of deliquescent desiccants have made certain improvements to the desiccants and the process using these desiccants. In particular, the document "Liquid Drying by Solid Desiccant Materials: Experimental Study and Design Method", F. Augier, C. Boyer and M. Vassieu, O & Gas Science and Technology—Rev. IFP, Vol. 63 (2008), No. 6 , pp. 713-722, has been known, which describes drying using deliquescent products. U.S. Pat. No. 3,246,453 discloses a compressed air desiccant based on deliquescent material; in the specific configuration shown in FIG. 11, U.S. Pat. No. 3,246,453 discloses the use of a support layer (for the deliquescent material) made of plastic spheres, the dimensions of which are 2 inches in diameter to a desiccant having more than 8 inches in diameter; this support layer serves to better disperse the compressed air, Barnett J W in Oil and Gas Journal, Penwell, Houston, Tex., US, Vol. 94, No. 16, 15 Apr. 1996 , pages 68-70 , describes a new calcium chloride powder formulation for drying distillates from commercial refineries;it also discloses the use of a multi-layer salt powder support comprising two types of gravel topped with sand. EP171578 relates to a nuclear fuel processing method for extracting heavy metals.

SUMMARY OF THE INVENTION

As a result of significant technological means including pilot units and modeling techniques, the Applicant unexpectedly found that it was still possible to improve the performance of its drying process while reducing raw material consumption, i.e., consumption of deliquescent desiccants. These advantages and the features of the present invention are described below.

BRIEF DESCRIPTION OF THE DRAWINGS

The invention will be better understood and its advantages will become more apparent upon reading the following description of embodiments, which in no way are limiting, illustrated by the following attached figures, wherein.

DETAILED DESCRIPTION OF THE INVENTION

Figure 1:
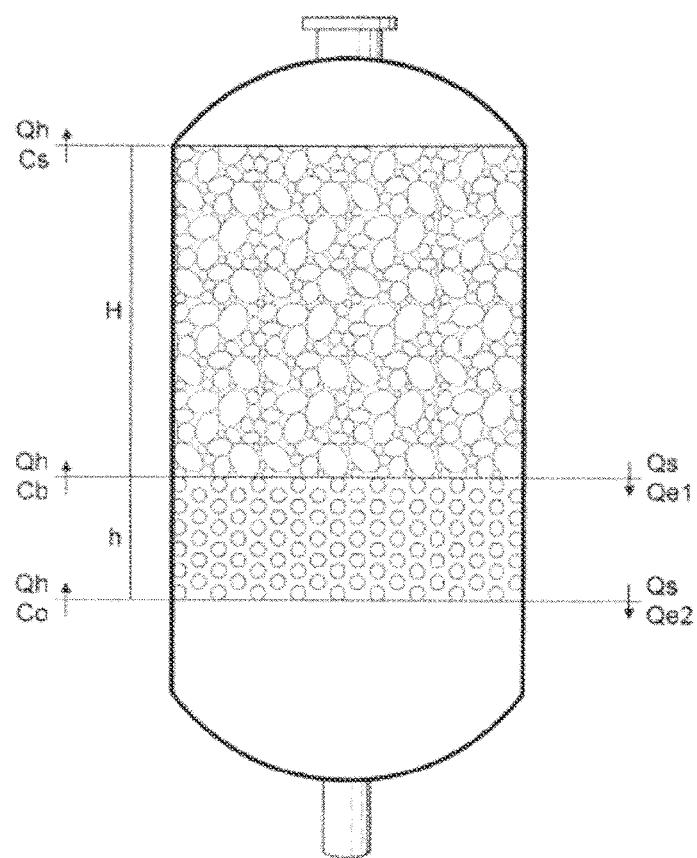
FIG. 1 shows the apparatus and the principle of the invention.
Figure 2:
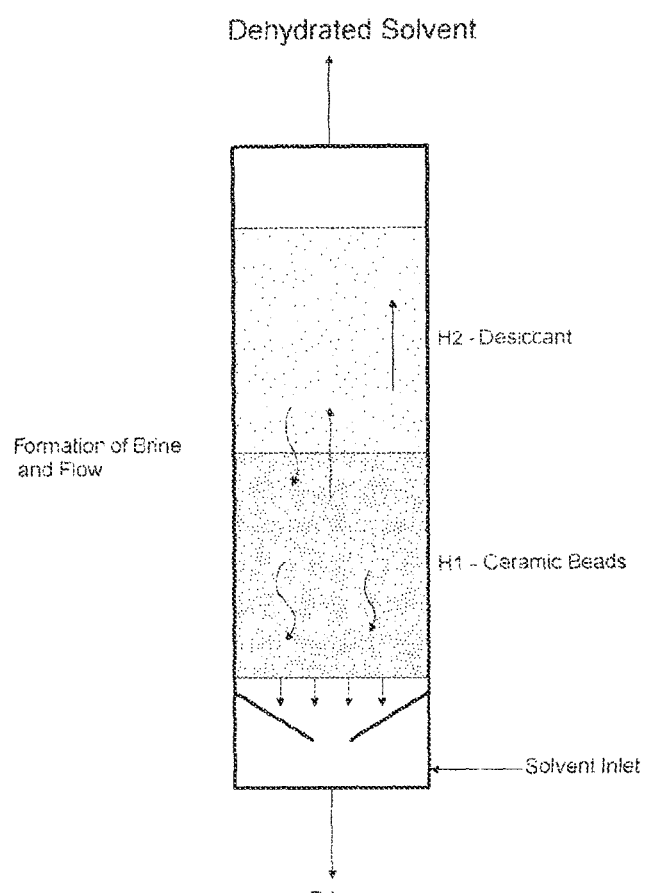
FIG. 2 shows the general principle of a similar method according to the prior art of F. Augier from 2008, identified above.

FIG. 1 shows the general principle of a method wherein the effluent to be dried enters into the column through a side duct (not shown) into the drying column. The column comprises a support grid for the drying bed, the lower part of which is formed by an inert bed with a bed with deliquescent agents on top. Contacting the deliquescent drying agents, the product to be treated is dried to form a brine which flows into the bottom of the drying column. When the brine crosses the inert bed, it still has considerable drying power; one of the objectives of this invention consists in optimizing the use of the desiccant power of said brine present in the inert layer. The dehydrated effluent exits through a pipe at the top of the column and the brine is recovered from the bottom of the column.

A more detailed description of FIG. 1 and of the physical parameters to which it refers will better illustrate this invention:

$Qh$: represents the flow rate of the gas/liquid introduced in the dehydration process in kg/hr $Qs$: represents the flow of the deliquescent agent that passes through the inert bed at kg/hr $Qe$: represents the flow of the water that passes through the inert bed at kg/hr $C$: represents the concentration of water (% by weight relative to the total weight) in the gas/liquid (o: start; b: after the inert bed; s: end)

$h$: represents the height of the inert bed $H$: represents the height of the deliquescent agent bed $S$: represents the salt concentration (in % by weight relative to the total weight) of the brine $K$: represents the transfer coefficient $A$: represents a specific surface area (Ab: the inert materials; Ac: the deliquescent agents)

$u$: represents the superficial flow velocity (m/s) of the gas/liquid; this superficial flow velocity corresponds to the flow of the gas/liquid divided by the column cross-section.

The Applicant was able to study all the above parameters to identify which of these parameters would have a major influence on optimizing the method of this invention. In addition, by studying the specific operational ranges, the applicant was able to define what would be easily implemented by one skilled in the art.

Thus, this invention relates to a method for dehydrating a liquid and/or gaseous effluent which is inserted against gravity through a drying column comprising a drying bed having an initial height of (H+h) constituted in its lower area by an inert material bed having the height of h and in its upper area by a bed of deliquescent desiccants having an initial height of H, the deliquescent desiccants having an initial weight of between 3 and 40 g, characterized in that the h/H ratio is lower than 0.49.

The inert material used for the bottom of the drying bed may be selected from a wide range of suitable inert products. Of course, we prefer chemically inert materials compatible with the degree of corrosion induced by the reaction medium. For example, ceramic materials may be mentioned, preferably engineering ceramics such as an oxide (for example aluminum oxide or zirconium oxide), non-oxides (such as carbides, borides, nitrides, ceramics made of silicon and of atoms such as tungsten, magnesium, platinum, or even titanium) and/or ceramic composites (combination of oxides and non-oxides).

Although the form of inert material is not critical, using spheroidal shapes is preferable. However, other forms such as rings and/or saddle-shaped tablets may also be used.

In one particular embodiment of this invention, the inert material is selected from among beads having a diameter between 5 and 30 mm.

The specific surface area ("Ab") of the inert material bed per cubic meter of bed is preferably greater than 100 m2/m3, more preferably greater than 150 m2/m3 . Although theoretically, one might support the use of inert material characterized by an infinite surface area, an intrinsic limitation of minimum sizes for the inert product would be quickly identified by those skilled in the art for example, based on the size of the grid holes supporting the bed and/or the calculation of pressure loss linked to the method used. Thus, it is generally preferred to limit the use of inert material having a surface area of less than 800 m2/m3 , preferably lower than 650 m2/ m3 (Ab).

So, in one particular embodiment of this invention, for a bed of inert material having a surface area between 100 and 800 m2/m3 (Ab), the ratio between the height of the bed of inert material and the initial height of the desiccant bed is less than 0.49 (h/H<0.49).

As shown in the tables below, the initial height of the bed of deliquescent agents and the size of the inert material have a considerable impact on the optimal height of the bed of inert material.

So, in a preferred embodiment of this invention, the h/H ratio is lower than or equal to the values indicated in Table 1 below based on the specific surface area of the inert material. It will then be very easy for those skilled in the art to define optimal maximum values of h/H with this table.

For example, for an inert material having a specific surface area of 500 m2/m3 (Ab), a rule of three is used to round to the closest values, namely to those corresponding respectively to 367 m2/m3 (0.183) and to 551 m2/m3 (0.122), which gives us:

0.183−[(0.183−0.122)*(500−367)/(551−367)]=0.139 h/H lower than or equal to 0.139

TABLE 1

|  | Diameter Inert (inches) | Diameter Inert (mm) | A inert m2/m3 | h/H |
| --- | --- | --- | --- | --- |
| Variation in the inert materials | bead ⅛" | 3.2 | 1102 | 0.061 |
|  | bead ¼" | 6.4 | 551 | 0.122 |
|  | bead ⅜" | 9.5 | 367 | 0.183 |
|  | bead ½" | 12.7 | 276 | 0.244 |
|  | bead ¾" | 19.1 | 184 | 0.366 |
|  | bead 1" | 25.4 | 138 | 0.488 |
|  | Saddle tablet ½" |  | 620 | 0.109 |
|  | Saddle tablet ¾" |  | 330 | 0.204 |
|  | Saddle tablet 1" |  | 260 | 0.259 |

It would also be possible to add beads with a diameter greater than 1 inch to the Table; however, one skilled in the art will readily understand that this will result in the selection of a maximum (optimal) height for the inert bed that occupies a great deal of space in the dehydration column and because of this limits the volume available for the active desiccants; which would not be considered by a person skilled in the art to be an optimal mode.

In this context, we prefer to use inert materials
  in which the specific surface area Ab is between 250 and 650 m2/m3, and/or
  the dimensions of which are less than 1 inch.

Figure 7:
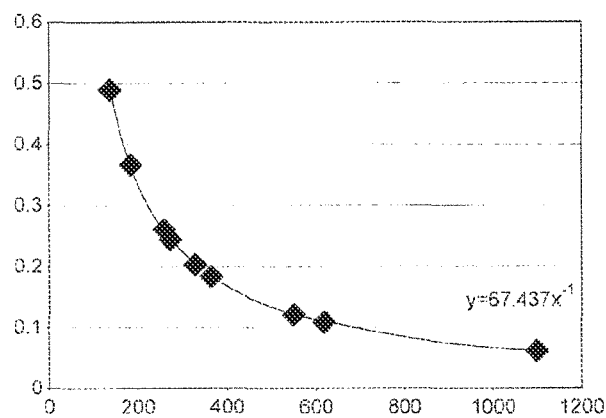
FIG. 7 illustrates the preferred maximum values for height ratios between the inert bed is and the deliquescent bed according to this invention.

Consequently, FIG. 7 illustrates the preferred maximum values for height ratios between the inert bed and the deliquescent bed according to this invention based on the specific surface area of the aforementioned inert materials. One can see the h/H ratio on the y-axis and the values of the specific surface areas of the inert material on the x-axis. So, in a preferred embodiment of this invention, the ratio between the height of the inert material bed and the initial height of the desiccant bed is lower than 67.5/Ab with Ab expressed as m2/m3.

The use of h/H ratios higher than the claimed maximum values is therefore not part of the present invention.

The mandatory presence of a bed of inert material according to this invention implies that there exists an h/H ratio greater than zero, for example, h/H is greater than or equal to 0.01, preferably greater than 0.015.

So, in a preferred embodiment of this invention, the h/H ratio is greater than or equal to the values indicated in Table 2 below based on the specific surface area of the inert material. It will then be very easy for those skilled in the art to define optimal minimum values of h/H with this table.

For example, for an inert material having a specific surface area of 500 m2/m3 (Ab), a rule of three is used to round to the closest values, namely to those corresponding respectively to 367 m2/m3 (0.029) and to 551 m2/m3 (0.019), which gives us:

0.029−[(0.029−0.019)*(500−367)/(551−367)]=0.022 h/H greater than or equal to 0.022

TABLE 2

|  | Diameter Inert (inches) | Diameter Inert (mm) | A inert m2/m3 | h/H |
| --- | --- | --- | --- | --- |
| variation in the inert materials | bead ⅛" | 3.2 | 1102 | 0.010 |
|  | bead ¼" | 6.4 | 551 | 0.019 |
|  | bead ⅜" | 9.5 | 367 | 0.029 |
|  | bead ½" | 12.7 | 276 | 0.039 |
|  | bead ¾" | 19.1 | 184 | 0.058 |
|  | bead 1" | 25.4 | 138 | 0.078 |
|  | Saddle tablet ½" |  | 620 | 0.017 |
|  | Saddle tablet ¾" |  | 330 | 0.032 |
|  | Saddle tablet 1" |  | 260 | 0.041 |

Figure 8:
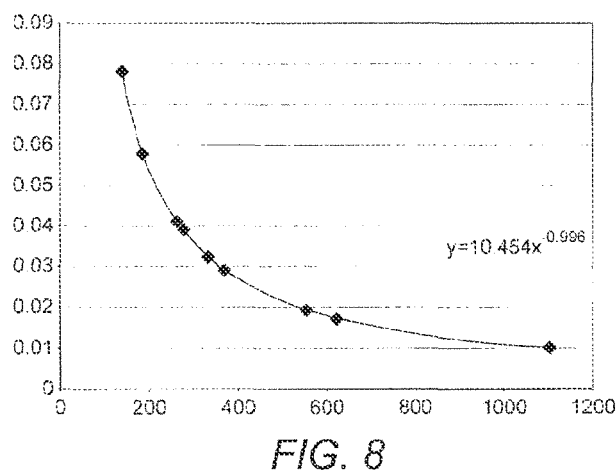
FIG. 8 illustrates the preferred minimum values for height ratios between the inert bed and the deliquescent bed according to this invention.

Therefore, FIG. 8 illustrates the preferred minimum values for height ratios between the inert bed and the deliquescent bed according to this invention, based on the specific surface areas of the aforementioned inert material. One can see the h/H ratio on the y-axis and the values of the specific surface areas of the inert material on the x-axis. So, in a preferred embodiment of this invention, the ratio between the height of the inert material bed and the initial height of the desiccant bed is greater than 10.4/Ab with Ab expressed as m2/m3.

Figure 9:
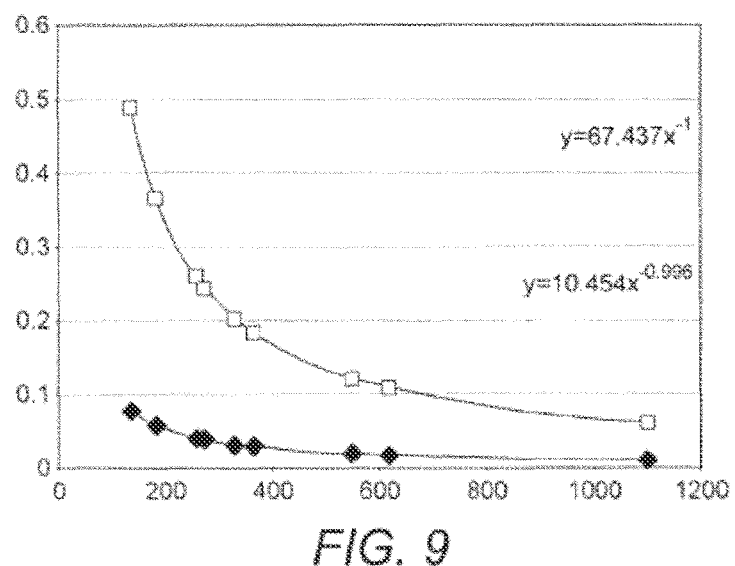
FIG. 9 illustrates the preferred range of values for the height ratios between the inert

Lastly, FIG. 9 illustrates the preferred range of values for the height ratios between the inert bed and the deliquescent bed according to this invention, according to this invention, based on the specific surface areas of the aforementioned inert material. One can see the h/H ratio on the y-axis and the values of the specific surface areas of the inert material on the x-axis. So, in a preferred embodiment of this invention, the ratio between the height of the bed of inert material and the initial height of the desiccant bed is greater than 10.4/Ab and lower than 67.5/Ab with Ab expressed as m2/m3.

This invention is not limited to the use of inert material of a single size. Inert material of different sizes may be used as well. Thus, according to one embodiment of this invention an inert bed is used consisting of at least two families of inert material of different sizes. For example, this choice will be made from among the aforementioned inert materials. For example, the inert material bed may be made up of at least two layers, with a preference for a lower layer having a specific surface area lower than the upper layer; thus, the presence of inert material of a larger size will prevent the passage through the support grid while allowing the use of smaller materials.

This invention also relates to a method for dehydrating a liquid and/or gaseous effluent which is inserted against gravity through a drying column comprising a drying bed comprising deliquescent desiccants characterized in that the deliquescent desiccants are initially made of a mixture of at least two families of different weights, said deliquescent desiccants having an initial weight of between 3 and 40 g.

In this invention and the following claims, "two families of desiccants having different weights" is preferably understood as the fact that at least one of the families are made up of desiccants having a weight that is at least 30% lower than the weight of the other family.

For example, the initial deliquescent desiccant bed will be made up of at least two layers, with a preference for a lower layer having a specific surface area lower than the upper layer. A mixture of at least two families of desiccants having different weights may therefore mean separate layers and/or a homogeneous or random mixture.

This invention therefore uses deliquescent desiccants which initially have a weight of between 3 and 40 g, preferably between 5 and 40 g. Preferably, products marketed by the Newton's Company (France) will be used in the grain-form of calcium chloride (CaCl2), sodium (NaOH) or potassium (KOH). Although the shapes of the deliquescent desiccants may be various (spheres, etc. . . . ), preferably, according to this invention, one would specifically use deliquescent desiccants in the form of cushions, because it was found that this type of shape provided optimum behavior in the agents with regard to their consumption. The specific cushion shape prevents caking of the bed, the formation of preferential paths and limits the pressure drop during use. The cushion-shaped tablet has a specific surface area greater than that of a bead of the same weight or the same volume, while limiting the surface loss associated with contact between grains, as is the case with flake-shaped forms. It offers an optimum of the actual surface area available. The cushion-shaped tablets also enables a gradual rearrangement of the bed as the latter is consumed. There is a gradual decrease in the height of the bed to achieve the minimum bed height required by the drying process.

The ranges of the preferred characteristics for deliquescent desiccants which are advantageously used in this invention are shown in the following tables:

| Sodium cushion tablet (NaOH) - weight (g) | Melting point (C.) | Water solubility at 20 C. (g/l) | Size (mm) Length Width Height | Volume (cm3) | Surface (cm2) | Specific area by unit of volume (m2/m3) | Apparent density (kg/m3) |
|---|---|---|---|---|---|---|---|
| 9.5-11.5 | 310-326 | 1000-1200 | 29-31 26-27 14-15 | 5-7 | 16-19 | 135-165 | 850-1050 |
| 25-31 | 310-326 | 1000-1200 | 36-40 33-37 17-21 | 13-17 | 30-38 | 100-140 | 950-1150 |

| Potassium cushion tablet (KOH) - weight (g) | Melting point (C.) | Water solubility at 20 C. (g/l) | Size (mm) Length Width Height | Volume (cm3) | Surface (cm2) | Specific area by unit of volume (m2/m3) | Apparent density (kg/m3) |
|---|---|---|---|---|---|---|---|
| 9.5-11.5 | 350-370 | 700-840 | 29-31 26-27 14-15 | 5-7 | 16-19 | 135-165 | 850-1050 |
| 25-31 | 350-370 | 700-840 | 36-40 33-37 17-21 | 13-17 | 30-38 | 100-140 | 950-1150 |

| Calcium chloride cushion tablet (CaCl2) - weight (g) | Melting point (C.) | Water solubility at 20 C. (g/l) | Size (mm) Length Width Height | Volume (cm3) | Surface (cm2) | Specific area by unit of volume (m2/m3) | Apparent density (kg/m3) |
|---|---|---|---|---|---|---|---|
| 9.5-11.5 | 700-840 | 680-800 | 29-31 26-27 14-15 | 5-7 | 16-19 | 135-165 | 850-1050 |

This invention therefore also relates to a mixture of deliquescent desiccants for the dehydration of a liquid and/or gas effluent characterized in that said mixture is made of a mixture of at least two deliquescent desiccant families of different weights, said deliquescent desiccants have an initial weight of between 3 and 40 g.

Thus, this invention relates to a method for dehydrating a liquid and/or gaseous effluent which is inserted against gravity through a drying column comprising an initial drying bed height (H+h) constituted in its lower area by an inert material bed having the height of h and in its upper area by deliquescent desiccants having an initial height of H, the deliquescent desiccants have an initial weight of between 3 and 40 g, characterized in that the h/H ratio is lower than 0.49, and the deliquescent desiccants are initially made of a mixture of at least two families of deliquescent desiccants of different weights.

This invention also relates to a unit for dehydrating a liquid and/or gaseous effluent, comprising a means for dehydrating the neutralized effluent comprising a drying bed and a means to collect the brine resulting from the dehydration, the drying bed being made in its lower part of an inert material bed having the height of h and in its upper part of a deliquescent desiccant bed having an initial height of H, wherein the deliquescent desiccants initially have a weight of between 3 and 40 g, and are preferably made of a mixture of at least two deliquescent desiccant families of different weights, and the h/H ratio is lower than 0.49.

In one embodiment of this invention, it may also be planned for the future the possible use of the brine discharged from the bottom of the column. By way of an example, the use of brine as a means of pre-neutralization for the effluent as described in the patent application WO2012010754 might be mentioned.

The dehydration unit for liquid or gaseous effluent according to this invention is therefore preferably a cylindrical dehydration column. The preferable height of industrial columns of this type is between 4 and 15 meters, for example between 5 and 10 meters. Their preferred diameter falls between 1 and 6 meters, for example between 3.5 and 6 meters. The presence of a drying bed support grid as shown schematically in FIG. 1 is preferred. In a preferred embodiment of this invention, the dehydration unit also includes a distributor that makes it possible to distribute liquid or gaseous effluent into the bottom of the unit, preferably under the distribution grid. Preferably, the orientation of the distribution of liquid or gaseous effluent will be such that it is not directly focused towards the bed and/or the support grid; for example, a separate distribution positioned in the column below the support grid and directing the liquid and gaseous effluent jets towards the bottom of the column has an additional benefit because it makes it possible to separate the free water which may be contained in the liquid or gaseous effluent.

Figure 3:
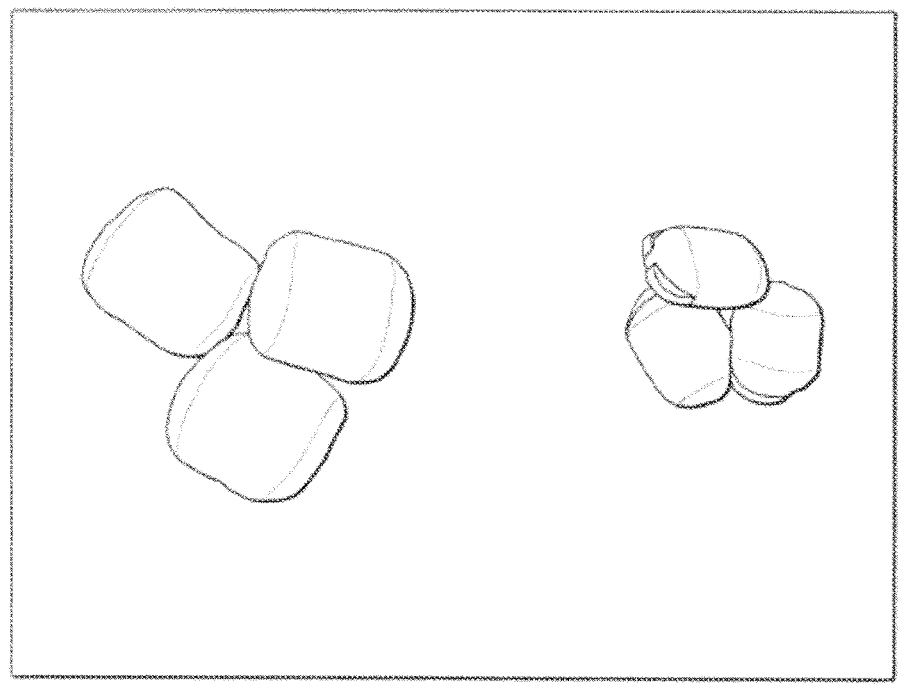
FIG. 3 shows the morphology of the deliquescent cushions, FIG. 4 schematically shows the results set forth in the Table in the first example.

Therefore, FIG. 3 accurately depicts the preferred morphology of the deliquescent agents which may be used in the context of this invention. The term "cushion" is especially appropriate and representative of the preferred morphology of said deliquescent agents. Some other terms representative of a cushion shape which are sometimes used, such as pebbles, pillows, nuts or carbon balls. This preferred morphology may also be characterized as an oblong qualifier.

The Applicant unexpectedly found a significant improvement in the drying process could be achieved through the present invention, i.e., optimization of the height of the layer of inert material mentioned above and/or optimization of the deliquescent agent mixture. The Applicant initially thought that it was necessary to maximize the inert material layer so that the dehydrating effect of the brine would be at a maximum; without which, it was found that efficiency quickly reached a plateau—albeit not wanting to be limited by this explanation, the Applicant believes that this optimization is intrinsically linked to the morphology of inert materials in combination with the morphology and type of deliquescent agents used. These developments have made it possible to define an initial minimum height H of the deliquescent desiccant bed based on the initial height of the inert material layer. It is therefore obvious to those skilled in the art that the process and the unit described and claimed in the present invention relates in particular to all start-up phases of the process, that is, upon first use and each time the unit is filled with the deliquescent desiccants.

This invention is not limited by the initial water content of the effluent to be dehydrated; however, in one particular embodiment of this invention, the effluent to be dehydrated initially contains less than 1000 ppm water, or even less than 600 ppm water. It is indeed with these ranges of water concentration that the method according to this invention will be more attractive from both the technical and business point of view. For example, the effluent to be dehydrated initially contains between 180 and 320 ppm water.

This invention reduces the concentration of said water by more than 50%, and even more than 75%. For example, the dried effluent contains less than 50 ppm or even less than 20 ppm of water.

Although there is no real limitation, this invention is particularly suitable for effluent flows to be dehydrated greater than 10 m3/h, greater than 50 m3/h, or even greater than 100 m3/h. Although there is no real limitation, this invention is particularly suitable for effluent flows to be dehydrated lower than 500 m3/h, or even lower than 400 m3/h.

Although there is no real limitation, this invention is particularly suitable for superficial flow velocity values (m/s) of the gas/liquid "u" greater than or equal to $2.10^{-4}$ m/s (0.2 mm/s), or even greater than or equal to $1.10^{-3}$ m/s (1 mm/s). Although there is no real limitation, this invention is particularly suitable for superficial flow velocity values (m/s) of the gas/liquid "u" lower than or equal to $5.10^{-3}$ m/s (5 mm/s), or even lower than or equal to $4.10^{-3}$ m/s (4 mm/s), Effluents likely to benefit from the drying process according to this invention will specifically be those currently used in refining. For example, LPG effluents may be mentioned, gasoline, diesel, kerosene, solvents (e.g. tetrahydrofuran, THF, dichloromethane-DCM or the monovinyl chloride-MVC), natural gases (methane, ethane, propane, butane, LNG). The application of the claimed method for diesel and kerosene was found to be particularly effective and significantly more attractive from both the technical and business point of view than, for example, vacuum drying.

This invention will now be illustrated by means of examples of the embodiments, tables, and figures that follow. This data was calculated using models developed through the experience accumulated by the Applicant in the field. These examples show the advantages linked to this invention, e.g., an economy of deliquescent agents and/or an increase in the overall performance of the dehydration process.

All the examples were carried out by means of inert beads with a diameter of 1/4 inch (6.4 mm), a specific surface area of 551 m2/m3.

The operating conditions of the startup were:
Effluent=diesel (temperature 40 C.)
Flow=200 m3/h
Cushion-shaped Sodium tablets (NaOH) composed of 40% by weight of the first type of cushion-shaped tablets defined in the table above and of 60% by weight of the second type of cushion-shaped tablets defined in the table above. Initial water concentration Co=500 ppm
Diameter of the drying column=4.8 m The 1$^{st}$ example consists in determining the optimum maximum height of the inert material bed for a total constant bed height, i.e., 5 meters (H+h).

Figure 4:
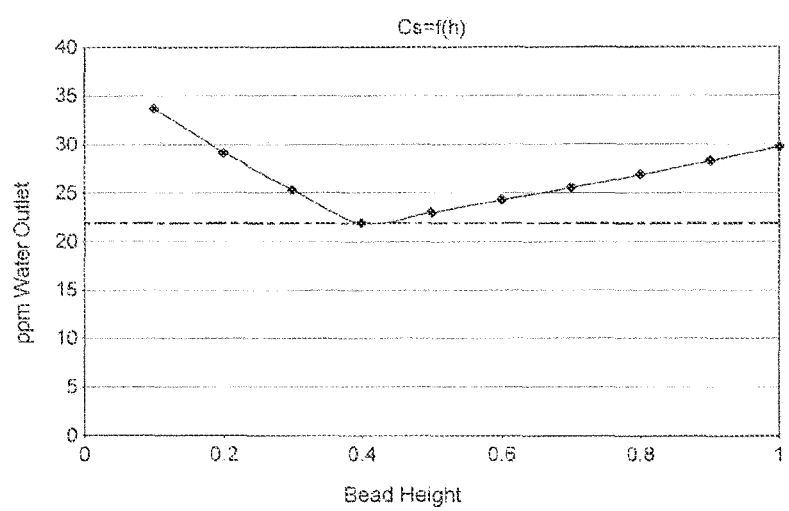

The results are shown in the Table below and also shown schematically in FIG. 4.

| h (m) | H (m) | Cb ppm | Cs ppm | h/H |
|---|---|---|---|---|
| 0 | 5 | 500 | 39 | 0.00 |
| 0.1 | 4.9 | 412 | 34 | 0.02 |
| 0.2 | 4.8 | 339 | 29 | 0.04 |
| 0.3 | 4.7 | 279 | 25 | 0.06 |
| 0.4 | 4.6 | 230 | 22 | 0.09 |
| 0.5 | 4.5 | 230 | 23 | 0.11 |
| 0.6 | 4.4 | 230 | 24 | 0.14 |
| 0.7 | 4.3 | 230 | 26 | 0.16 |
| 0.8 | 4.2 | 230 | 27 | 0.19 |
| 0.9 | 4.1 | 230 | 28 | 0.22 |
| 1 | 4.0 | 230 | 30 | 0.25 |

We can therefore conclude that any increase in the inert height above 0.5 m (or an h/H ratio of 0.11) has a negative impact on the effectiveness of the process.

The second example is to assess the impact of speed "u" on the maximum optimum height h and the ratio h/H, H being set at 5 m.

Figure 5:
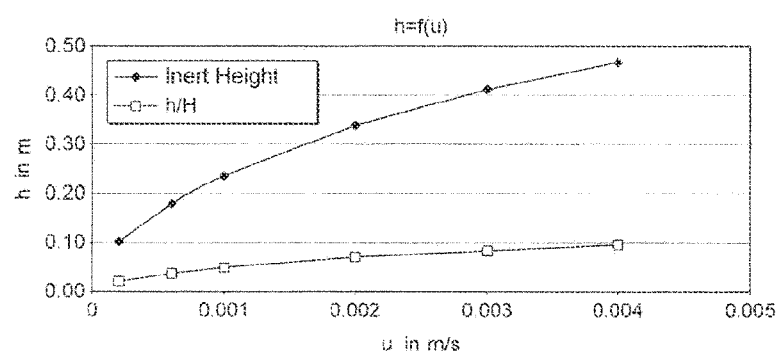
FIG. 5 schematically shows the results set forth in the Table in the second example.

The results are shown in the Table below and also shown schematically in FIG. 5.

| | Inert | A Inert | u (m/s) | h (m) | h/H |
|---|---|---|---|---|---|
| Variation in Speed | Bead 1/4" | 551 | 0.004 | 0.47 | 0.093 |
| | Bead 1/4" | 551 | 0.003 | 0.41 | 0.082 |
| | Bead 1/4" | 551 | 0.002 | 0.34 | 0.067 |
| | Bead 1/4" | 551 | 0.001 | 0.23 | 0.047 |
| | Bead 1/4" | 551 | 0.0006 | 0.18 | 0.036 |
| | Bead 1/4" | 551 | 0.0002 | 0.10 | 0.019 |

The third example is to assess the impact of the height h+H on the maximum optimum height h and the ratio h/H, u being set at 3 mm/s.

Figure 6:
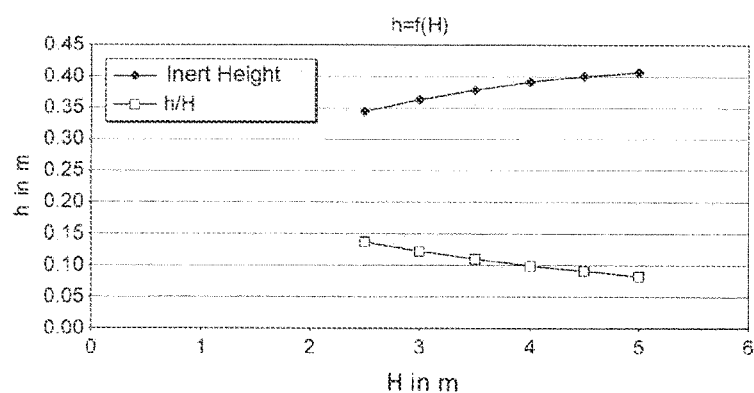
FIG. 6 schematically shows the results set forth in the Table in the third example

The results are shown in the Table below and also shown schematically in FIG. 6.

| | Inert | A Inerte | H (m) | h (m) | h/H |
|---|---|---|---|---|---|
| H Variatio | bead 1/4" | 551 | 5 | 0.41 | 0.082 |
| | bead 1/4" | 551 | 4.5 | 0.40 | 0.089 |
| | bead 1/4" | 551 | 4 | 0.39 | 0.098 |
| | bead 1/4" | 551 | 3.5 | 0.38 | 0.109 |
| | bead 1/4" | 551 | 3 | 0.37 | 0.122 |
| | bead 1/4" | 551 | 2.5 | 0.34 | 0.138 |

The invention claimed is:

1. Dehydration method for a liquid or gaseous effluent selected from the group consisting of LPG, gasoline, diesel, kerosene, solvents and natural gases, said method comprising the steps of:
    inserting the liquid or gaseous effluent against gravity through a drying column comprising a drying bed having an initial height (H+h) constituted in its lower area by an inert material bed having the height of h and in its upper area by deliquescent desiccants having an initial height of H, the deliquescent desiccants having an initial weight of between 3 and 40 g, wherein the h/H ratio is lower than 0.49; and the inert material has a specific surface area greater than 100 m2/m3 and lower than 800 m2/m3; and
    separating water from the liquid or gaseous effluent.

2. Method according to claim 1 wherein the inert material are spherical beads having a diameter between 5 and 30 mm.

3. Method according to claim 1 wherein the inert material has a specific surface area greater than 150 m2/m3 and lower than 800 m2/m3.

4. Method according to claim 1 wherein the inert material has a specific surface area lower than 650 m2/m3 and greater than 100 m2/m3.

5. Method according to claim 1 wherein the inert material has a specific surface area are between 250 and 650 m2/m3.

6. Method according to claim 1 wherein the h/H ratio is equal to or lower than the values indicated in Table below based on the specific surface area of the inert material.

| | Diameter Inert (inches) | Diameter Inert (mm) | A inert m2/m3 | h/H |
|---|---|---|---|---|
| variation in the inert materials | bead 1/8" | 3.2 | 1102 | 0.061 |
| | bead 1/4" | 6.4 | 551 | 0.122 |
| | bead 3/8" | 9.5 | 367 | 0.183 |
| | bead 1/2" | 12.7 | 276 | 0.244 |
| | bead 3/4" | 19.1 | 184 | 0.366 |
| | bead 1" | 25.4 | 138 | 0.488 |
| | Saddle 1/2" | | 620 | 0.109 |
| | Saddle 3/4" | | 330 | 0.204 |
| | Saddle 1" | | 260 | 0.259. |

7. Method according to claim 1 wherein the h/H ratio is equal to or greater than the values indicated in the table below based on the specific surface area of the inert material.

| | Diameter Inert (inches) | Diameter Inert (mm) | A inert m2/m3 | h/H |
|---|---|---|---|---|
| variation in the inert materials | bead 1/8" | 3.2 | 1102 | 0.010 |
| | bead 1/4" | 6.4 | 551 | 0.019 |
| | bead 3/8" | 9.5 | 367 | 0.029 |
| | bead 1/2" | 12.7 | 276 | 0.039 |
| | bead 3/4" | 19.1 | 184 | 0.058 |
| | bead 1" | 25.4 | 138 | 0.078 |
| | Saddle 1/2" | | 620 | 0.017 |
| | Saddle 3/4" | | 330 | 0.032 |
| | Saddle 1" | | 260 | 0.041. |

8. Method according to claim 1 wherein the deliquescent desiccants are initially made of a mixture of at least two families of different weights.

9. Method according to claim 1 wherein the deliquescent desiccants are selected from the group consisting of calcium chloride (CaCl2), sodium (NaOH) and potassium (KOH).

10. Method according to claim 1 wherein the deliquescent desiccants have an initial oblong form.

11. Method according to claim 1 wherein the solvents are selected from the group consisting of THF, DCM and TEA, and the natural gases are selected from the group consisting of propane, butane and LNG.

12. Method according to claim 8 wherein at least one of the families is made up of desiccants having a weight that is at least 30% lower than the weight of the other family.

13. Method according to claim 10 wherein the deliquescent desiccants are in the form of a cushion.

14. Method according to claim 1 wherein the effluent is selected from the group consisting of diesel and kerosene.

* * * * *